United States Patent Office 2,952,673
Patented Sept. 13, 1960

2,952,673

5-ARYLAZORHODANINES

Isaac Benghiat, Bronx, and John C. Howard, Norwich, N.Y., assignors to Stauffer Chemical Company, a corporation of Delaware No Drawing. Filed Feb. 28, 1958, Ser. No. 718,446

7 Claims. (Cl. 260—158)

This invention relates to 5-arylazo-rhodanines and 3-substituted 5-arylazo-rhodanines and their preparation.

It is an object of this invention to provide a method for the production of new compositions which are formed by the reaction of rhodanine or 3-substituted rhodanines and aryldiazonium salts.

It is a further object of this invention to provide for the production of bactericidal and bacteriostatic materials of unusual effectiveness.

Other objects and advantages of this invention if not specifically set forth will become apparent during the course of the discussion which follows.

Generally, it has been found that 5-arylazo-rhodanines and 3-substituted 5-arylazo-rhodanines may be produced by the reaction between rhodanine or 3-substituted rhodanines and aryldiazonium salts in buffered solutions. These new compositions of matter display unusual bacteriological activity.

More specifically, it has been found that new compositions of matter having a general formula, which may be considered as

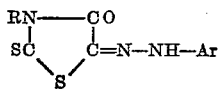

or

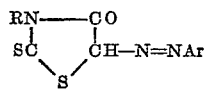

where R is hydrogen or a monovalent alkyl or aralkyl radical and Ar is a monovalent aromatic radical, may be produced by the reaction between rhodanine or a 3-substituted rhodanine and an aryldiazonium salt.

The reaction may be represented (using the second of the above formulae) as follows:

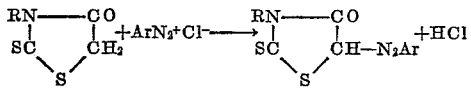

In general, the 5-arylazo-rhodanines may be prepared by first forming an acid solution or suspension of aniline or a substituted aniline material. To this is added an approximately equivalent quantity of sodium nitrite to form a diazonium salt. To this is slowly added an equivalent amount of an acidic solution of the rhodanine corresponding to the product desired. During the addition, the mixture is desirably maintained at a temperature within the range about 0–5° C. In this fashion a solution is formed containing both the rhodanine and diazonium salt. This is then added to a cold aqueous solution of sodium acetate and the mixture allowed to stand for a period of time following which the separated product is filtered, washed and dried. It may be crystallized from a suitable solvent. Yields are on the order of at least about 90 percent. A wide number of products have been prepared in this fashion, as set forth in examples which follow and in the table.

Each of the compounds prepared through the process of this invention has been assigned a code number and reference hereafter to the compounds is by means of the appropriate code number.

The examples which follow are for illustrative purposes only and are not to be construed as imposing limitations on the scope of the invention other than as set forth in the appended claims.

EXAMPLE I

*N–1162, 5-(phenylazo)-rhodanine*

A solution of 0.1 gram-mole of aniline in 100 ml. of 6 N HCl is diazotized by the addition of 0.11 gram-mole of sodium nitrite at 0.5° C. To the resulting solution of the diazonium salt a solution of 0.1 gram-mole of rhodanine in 400 ml. of glacial acetic acid at 25° C. is added slowly with cooling so that the mixture is maintained at 0–5° C. The resulting solution which contains both the rhodanine and the diazonium salt is then added with stirring to a cold solution of 300 grams of sodium acetate in 800 ml. of water. The product separates immediately. When the addition is complete, the resulting thick slurry is stirred 45 minutes longer at 5° C. The mixture is allowed to warm to room temperature. It is then allowed to stand overnight. The product is then filtered, washed several times with water and air dried. It is then crystallized from a mixture of acetic acid and dimethyl formamide. The yield is quantitative. The product melts at 242–244° dec. Analysis: Calcd. for $C_9H_7N_3OS_2$: C, 45.55; H, 2.98; N, 17.7. Found: C, 45.40; H, 3.09; N, 17.7.

EXAMPLE II

*N–1185, 3-methyl-5-(p-nitrophenylazo)-rhodanine*

The procedure described in Example I was followed using a suspension of 0.1 gram-mole of p-nitroaniline in 6 N HCl in place of aniline and using 3-methylrhodanine in place of rhodanine. The product was obtained in 92 percent yield. A portion was recrystallized from acetic acid for analysis. M.P. 267–268° dec. Analysis: Calcd. for $C_{10}H_8N_4O_3S_2$: S, 21.6. Found: S, 21.3. The following compounds were prepared in a similar manner:

TABLE I

| Compound Number | R | Ar |
|---|---|---|
| N–1161 | H | p-nitrophenyl. |
| N–1197 | H | p-chlorophenyl. |
| N–1202 | H | p-methoxyphenyl. |
| N–1208 | H | o-tolyl. |
| N–1220 | $CH_2=CH-CH_2-$ | p-nitrophenyl. |
| N–1223 | $(CH_3)_2CH-$ | p-bromophenyl. |
| N–1230 | $C_4H_9-CH-CH_2$<br>$\quad\quad\quad\mid$<br>$\quad\quad\quad C_2H_5$ | p-nitrophenyl. |
| N–1242 | $CH_3OCH_2CH_2-$ | x,x-xylyl. |
| N–1243 | $CH_3OCH_2CH_2CH_2-$ | x,x-xylyl. |
| N–1244 | $(CH_3)_2NCH_2CH_2CH_2-$ | p-nitrophenyl. |
| N–1285 | cyclohexyl ($H_2C_6H_{10}$-) | p-nitrophenyl. |
| N–1289 | $HOOCCH_2-$ | p-nitrophenyl. |
| N–1303 | $C_6H_5CH_2-$ | p-nitrophenyl. |
| N–1319 | $ClC_6H_4CH_2-$ | p-nitrophenyl. |
| N–1342 | $CH_3$ | 2,4-dinitrophenyl. |
| N–1343 | $CH_3$ | 2,4-dichlorophenyl. |
| N–1369 | $CH_3$ | p-biphenylyl. |
| N–1370 | $CH_3$ | α-naphthyl. |
| N–1371 | $CH_3$ | β-naphthyl. |
| N–1387 | $CH_3$ | p-ethoxyphenyl |
| N–1654 | $CH_3$ | m-nitrophenyl. |
| N–1655 | $CH_3$ | o-nitrophenyl. |
| N–1663 | n-$C_4H_9$ | p-nitrophenyl. |
| N–1667 | n-$C_{12}H_{25}$ | p-nitrophenyl. |
| N–1676 | $CH_3$ | o-chlorophenyl. |
| N–1678 | $CH_3$ | m-chlorophenyl. |
| N–1681 | $CH_3$ | p-chlorophenyl. |
| N–1688 | n-$C_8H_{17}$ | p-nitrophenyl. |

In making the following tests, the various compounds in the concentrations indicated were mixed with nutrient agar in Petri dishes and inoculated with three species of bacteria. The bacteria used were *Staphlococcus aureus*, *Escherichia coli* and *Erwinia amylovora*. The antiseptic action was indicated by the absence of growth designated by a zero (0); growth being designated by a plus sign (+). At points (A) in the table, only *E. coli* showed growth. At all other points, all bacteria were controlled at the concentrations given. The concentrations are in parts per million based upon the quantity of agar present.

TABLE II

|  | 2500 p.p.m. | 1000 p.p.m. | 500 p.p.m. | 250 p.p.m. | 100 p.p.m. | 50 p.p.m. |
|---|---|---|---|---|---|---|
| N-1161 | 0 | 0 | 0 | 0 | 0 | + |
| N-1162 | 0 | 0 | A | A | + | + |
| N-1185 | 0 | 0 | 0 | 0 | + | + |
| N-1197 | 0 | 0 | 0 | 0 | 0 | + |
| N-1208 | 0 | 0 | + | + | + | + |
| N-1202 | 0 | + | + | + | + | + |

As can be seen from the above, the compounds of the instant invention are effective bactericides even when applied in relatively low concentrations.

Obviously many modifications and variations of the invention as hereinbefore set forth may be made without departing from the spirit and scope thereof, and therefore only such limitations should be imposed as are indicated in the appended claims.

We claim:
1. Arylazo-rhodanines of the general formula:

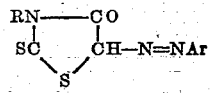

where R is selected from the class consisting of H, alkyl groups of less than 13 carbon atoms, lower alkenyl, lower alkoxy-substituted lower alkyl, amino-substituted lower alkyl, lower cycloalkyl, benzyl, chloro-substituted benzyl and $HOOCCH_2-$, and where Ar is selected from the class consisting of phenyl, lower alkyl-substituted phenyl, nitrophenyl, dinitrophenyl, lower alkoxyphenyl, chlorophenyl, bromophenyl, biphenyl and naphthyl.
2. 5-p-nitrophenylazo-rhodanine.
3. 5-phenylazo-rhodanine.
4. 3-methyl-5-p-nitrophenylazo-rhodanine.
5. 5-p-chlorophenylazo-rhodanine.
6. 5-p-methoxyphenylazo-rhodanine.
7. 5-o-tolylazo-rhodanine.

References Cited in the file of this patent
UNITED STATES PATENTS

| 1,962,109 | Alvord | June 5, 1934 |
| 2,028,141 | Ackermann | Jan. 24, 1936 |
| 2,683,708 | Dickey et al. | July 13, 1954 |
| 2,683,709 | Dickey et al. | July 13, 1954 |
| 2,743,211 | Bashour | Apr. 24, 1956 |
| 2,832,764 | Huenig | Apr. 29, 1958 |

FOREIGN PATENTS

| 1,129,111 | France | Sept. 3, 1956 |

OTHER REFERENCES

Elderfield: Heterocyclic Compounds, vol. 5, pp. 715–716 (1957).